United States Patent
Koen et al.

(10) Patent No.: US 12,166,748 B2
(45) Date of Patent: Dec. 10, 2024

(54) DECENTRALIZED ATTRIBUTE-BASED ACCESS CONTROL

(71) Applicant: Microsoft Technology Licensing, LLC, Redmond, WA (US)

(72) Inventors: Peter Koen, Burgenland (AT); Babak Ghane Jahromi, Redmond, WA (US); Pamela Dingle, Redmond, WA (US); Stefanus Martinus Van Der Wiele, Alkmaar (NL); James Marino, Newtown, PA (US); Paul Latzelsperger, Upper Austria (AT)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 17/829,231

(22) Filed: May 31, 2022

(65) Prior Publication Data

US 2023/0388287 A1    Nov. 30, 2023

(51) Int. Cl.
*H04L 9/40*        (2022.01)
*H04L 41/5006*     (2022.01)

(52) U.S. Cl.
CPC ...... *H04L 63/0815* (2013.01); *H04L 41/5006* (2013.01); *H04L 63/101* (2013.01); *H04L 63/104* (2013.01)

(58) Field of Classification Search
CPC . H04L 63/0815; H04L 63/101; H04L 63/104; H04L 41/5006
See application file for complete search history.

(56) References Cited

U.S. PATENT DOCUMENTS

| | | | |
|---|---|---|---|
| 11,669,630 B1* | 6/2023 | Arikatla | G06F 21/6218 726/1 |
| 2018/0183802 A1* | 6/2018 | Choyi | H04L 63/205 |
| 2020/0211409 A1* | 7/2020 | Latorre | G16H 10/60 |
| 2021/0216983 A1* | 7/2021 | Glickman | G06Q 20/127 |

OTHER PUBLICATIONS

Sporny, et al., "Decentralized Identifiers (DIDs) v1.0", Retrieved from: https://www.w3.org/TR/did-core/, Aug. 3, 2021, 104 Pages.
Sporny, et al., "Verifiable Credentials Data Model v1.1", Retrieved from: https://www.w3.org/TR/vc-data-model/, Mar. 3, 2022, 122 Pages.
Tsai, et al., "Decentralized Web Node", Retrieved from: https://identity.foundation/decentralized-web-node/spec/, Retrieved on: Apr. 26, 2022, 34 Pages.

* cited by examiner

*Primary Examiner* — Kristie D Shingles

(57) ABSTRACT

Embodiments of the present disclosure include systems and methods for providing a decentralized federation for attribute-based access control. A request for a list of unique identifiers (IDs) associated with members belonging to the federation is sent to a federation authority. For a unique ID in the list of unique IDs associated with a second member belonging to the federation, a set of communication information for communicating with the second member is determined. Based on the set of communication information associated with the second member, the second member is sent a request for a list of available services. The second member is provided a set of verifiable credentials associated with the first member. The second member determines the list of available services based on the set of verifiable credentials and a set of policies and rules. The list of available services is received from the second member.

20 Claims, 7 Drawing Sheets

DECENTRALIZED ATTRIBUTE-BASED ACCESS CONTROL

BACKGROUND

The present disclosure relates to data management. More particularly, the present disclosure relates to techniques for controlling access to data and/or services.

Access control allows organizations to control how users, employees, and/or third parties access data and/or services in a manner that meets security, privacy, and/or compliance requirements. In some cases, such requirements are set by security best practices and official regulations, such as general data protection regulation (GDPR), health insurance portability and accountability act (HIPAA), national institute of standards and technology (NIST), etc. These regulations often require organizations to audit and place controls over the entities that can access sensitive information.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
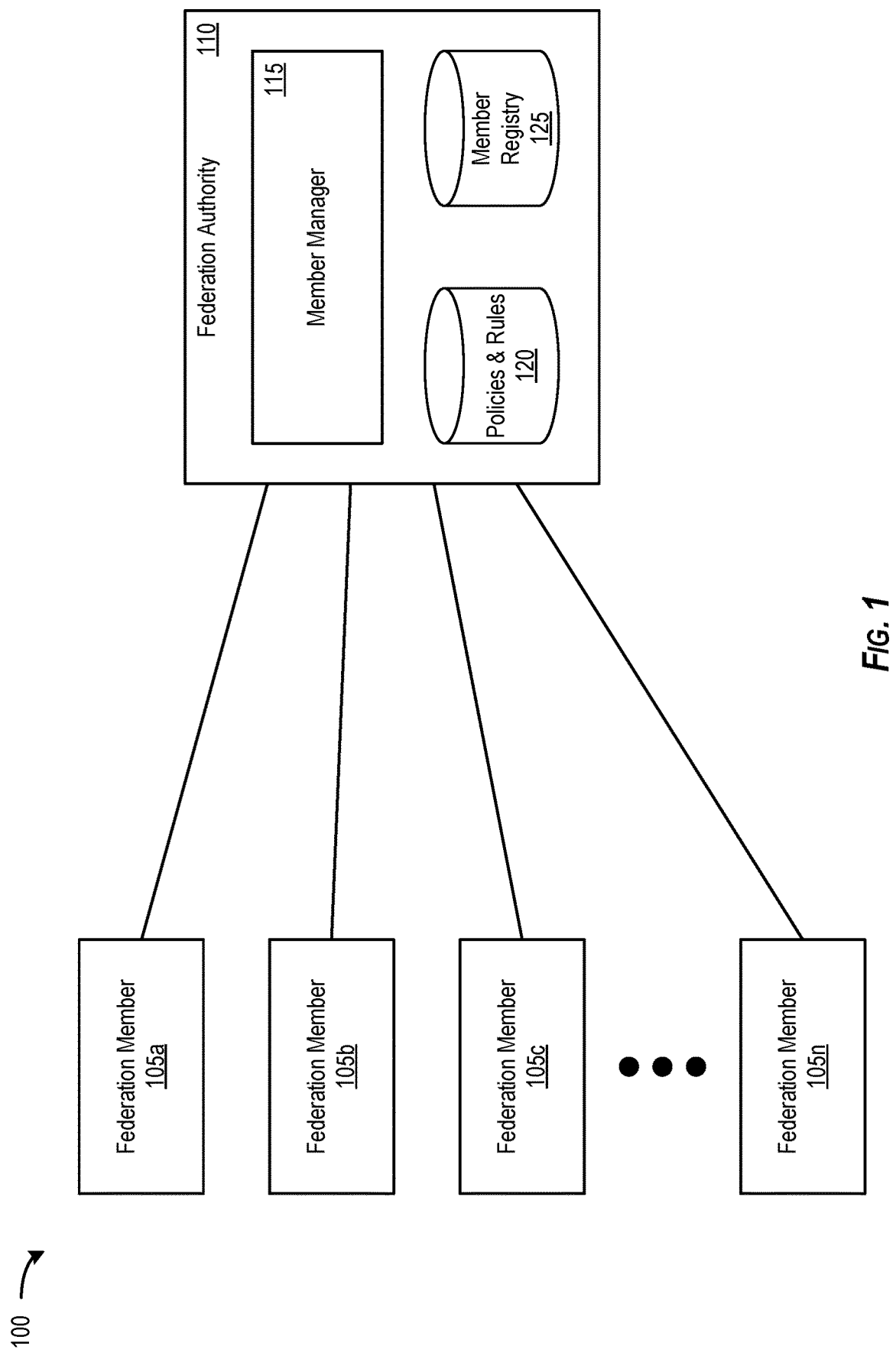
FIG. 1 illustrates a decentralized federation for controlling data and service access according to some embodiments.

Described here are techniques for providing an attribute-based access control for decentralized federations. FIG. 1 illustrates a decentralized federation 100 for controlling data and service access according to some embodiments. As shown, federation 100 includes federation members 105a-n and federation authority 110. In some embodiments, each of the federation members 105a-n is using a separate cloud computing system. That is, federation 100 is a multi-cloud federation in some such embodiments. In this example, each of the federation members 105a-n has applied to join, and received acceptance to, federation 100 via federation authority 110. In addition, each of the federation members 105a-n is configured to provide services to other federation members 105a-n and consume services offered by the other federation members 105a-n. For example, when a first federation member 105 wants to consume a service offered by a second federation member 105, the first federation member 105 identifies the second federation member 105 (e.g., by querying federation authority 110 for a list of members) and sends the second federation member 105 a request for a list of services offered by the second federation member 105. In response to the request, the second federation member 105 retrieves information associated with the first federation member 105 (e.g., verifiable claims, verifiable credentials, etc.). Based on the information associated with the first federation member 105, the second federation member 105 can determine a subset of available services provided by the second federation member 105 and determine terms of access for each of those available services. A second federation member 105 may determine different subsets of available services based on different information associated with different first federation members 105. Similarly, a second federation member 105 can determine different terms of available services based on different information associated with different first federation members 105. In this manner, a particular federation member 105 is able to provide different access to data and/or services to other federation members 105 based on different attributes associated with the other federation members 105. After determining available services and terms for the services, the second federation member 105 may send the subset of available services to the first federation member 105. The first federation member 105 can access any of the available services according to the respective terms determined for the service.

Federation authority 110 is responsible for managing membership to federation 100. As illustrated in FIG. 1, federation authority 110 includes member manager 115, policies and rules storage 120, and member registry storage 125. Policies and rules storage 120 stores policies, rules, and required claims for determining membership to federation 100. Member registry storage 125 stores unique identifiers (e.g., decentralized identifiers (DIDs)) associated with members in federation 100 and/or references to such unique identifiers. In some embodiments, storages 120 and 125 are implemented in a single physical storage while, in other embodiments, storages 120 and 125 may be implemented across several physical storages. While FIG. 1 shows storages 120 and 125 as part of federation authority 110, one of ordinary skill in the art will appreciate that policies and rules storage 120 and/or member registry storage 125 may be external to federation authority 110 in some embodiments. In some embodiments, the various operations described herein that are performed by federation authority 110 (e.g., processing policies, rules, memberships, etc.) may be implemented in a decentralized manner across multiple computing devices and/or systems. In some such embodiments, the decentralized processes can be performed in parallel as appropriate.

Figure 2:
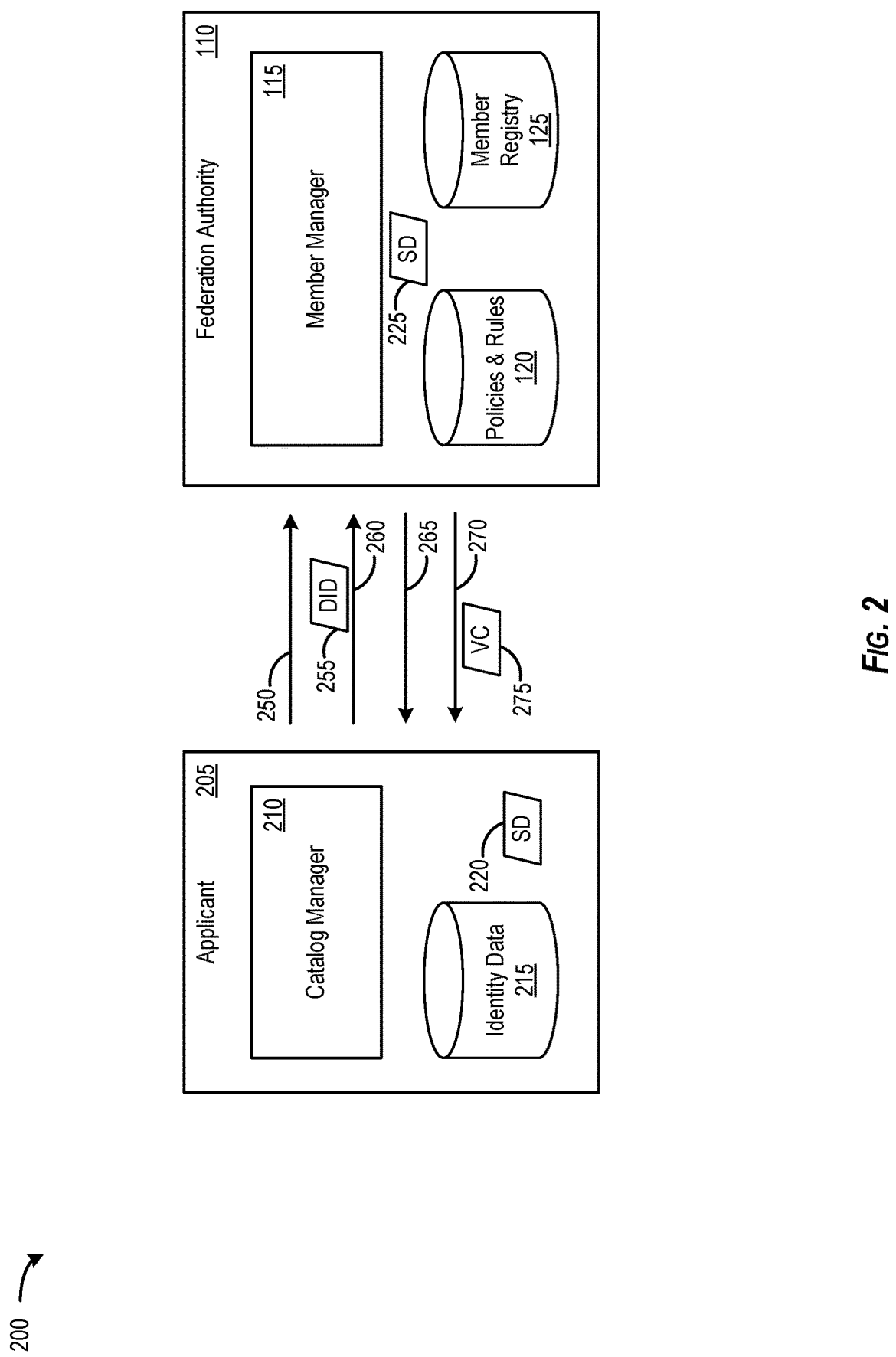
FIG. 2 illustrates an example data flow for joining a federation according to some embodiments.

Several example data flows will now be described by reference to FIGS. 2-4. Specifically, these example data flows show how a new member joins a federation, how federation members control access to services and/or data between each other, and how a federation member accesses services and/or data provided by another federation member. FIG. 2 illustrates an example data flow 200 for joining federation 100 according to some embodiments. Data flow 200 may represent the flow of data between each of the federation members 105a-n and federation authority 100 when the federation member 105 is applying to join federation 100. As depicted, data flow 200 includes applicant 205 and federation authority 110. For this example, applicant 205 is not yet part of federation 100. Applicant 205 includes catalog manager 210 and identity data storage 215. Identity data storage 215 stores identity information associated with the applicant 205. Examples of such identity information include verifiable claims, verifiable credentials (e.g., world wide web consortium (W3C) verifiable credentials), etc. In some embodiments, a verifiable credential is tamper-proof credential that can be verified cryptographically. In some cases, identity data storage 215 is implemented as a decentralized web node. In some embodiments, a decentralized web node (DWN) is a data storage and message relay mechanism used to locate public or private permissioned data related to a given DID.

Catalog manager 210 is configured to manage a catalog of available service contracts provided by other federation members (e.g., federation members 105a-n). In some embodiments, a service contract may specify a set of services provided by a federation member (e.g., a service for accessing data, a service for processing data, etc., or any other service(s) that provides software functionalities). In this example, it is assumed that applicant 205 has already obtained a unique identifier associated with applicant 205. Specifically, applicant 205 has obtained a DID (e.g., a W3C DID) for this example. In addition, applicant 205 has created self-description 220, that includes information describing applicant 205. For this example, self-description 220 includes a list of services for participation in federation 100, claims associated with applicant 205, attributes associated with applicant 205, etc.

The example data flow 200 begins by applicant 205 contacting, at 250, federation authority 110 using the DID for identifying federation authority 110. Applicant 205 then accesses self-description 225, which includes information required to apply for membership to federation 100 (e.g., rules, attributes, required claims, etc.), of federation authority 110. In some instances, applicant 205 the DID for identifying federation authority 110 includes a reference to self-description 225. In some such instances, applicant 205 uses the reference in the DID to access self-description 225. Based on the information in self-description 225, applicant 205 sends, at 255, federation authority 110 a request to join federation 100 along with DID 255, which is the DID for identifying applicant 205.

In response to the request, federation authority 110 uses DID 255 to access, at 265, self-description 220 of applicant 205. In some embodiments, DID 255 includes a reference to self-description 220. In some such embodiments, federation authority 110 uses the reference in DID 255 to access self-description 220. Then, federation authority 110 determines whether to allow applicant 205 to join federation 100 by checking the claims in self-description 220 against the policies, rules, and mandatory claims stored in policies and rules storage 120. If the claims associated with applicant 205 satisfy the policies, rules, and mandatory claims, member manager 115 determines that applicant 205 is allowed to join federation 100. Otherwise, member manager 115 does not allow applicant 205 to join federation 100. Here, member manager 115 determines that applicant 205 is allowed to join federation 100. As such, member manager adds applicant 205 to member registry storage 125 (e.g., by adding DID 255 to member registry storage 125). Additionally, member manager 115 generates verifiable credential 275 indicating that applicant 205 is a member of federation 100. Next, member manager 115 sends, at 270, VC 275 to applicant 205. Upon receiving VC 275, applicant 205 stores it in identity storage 215. Then, catalog manager 210 initiates the discovery of service contracts offered by other federation members (e.g., federation members 105a-n).

Figure 3:
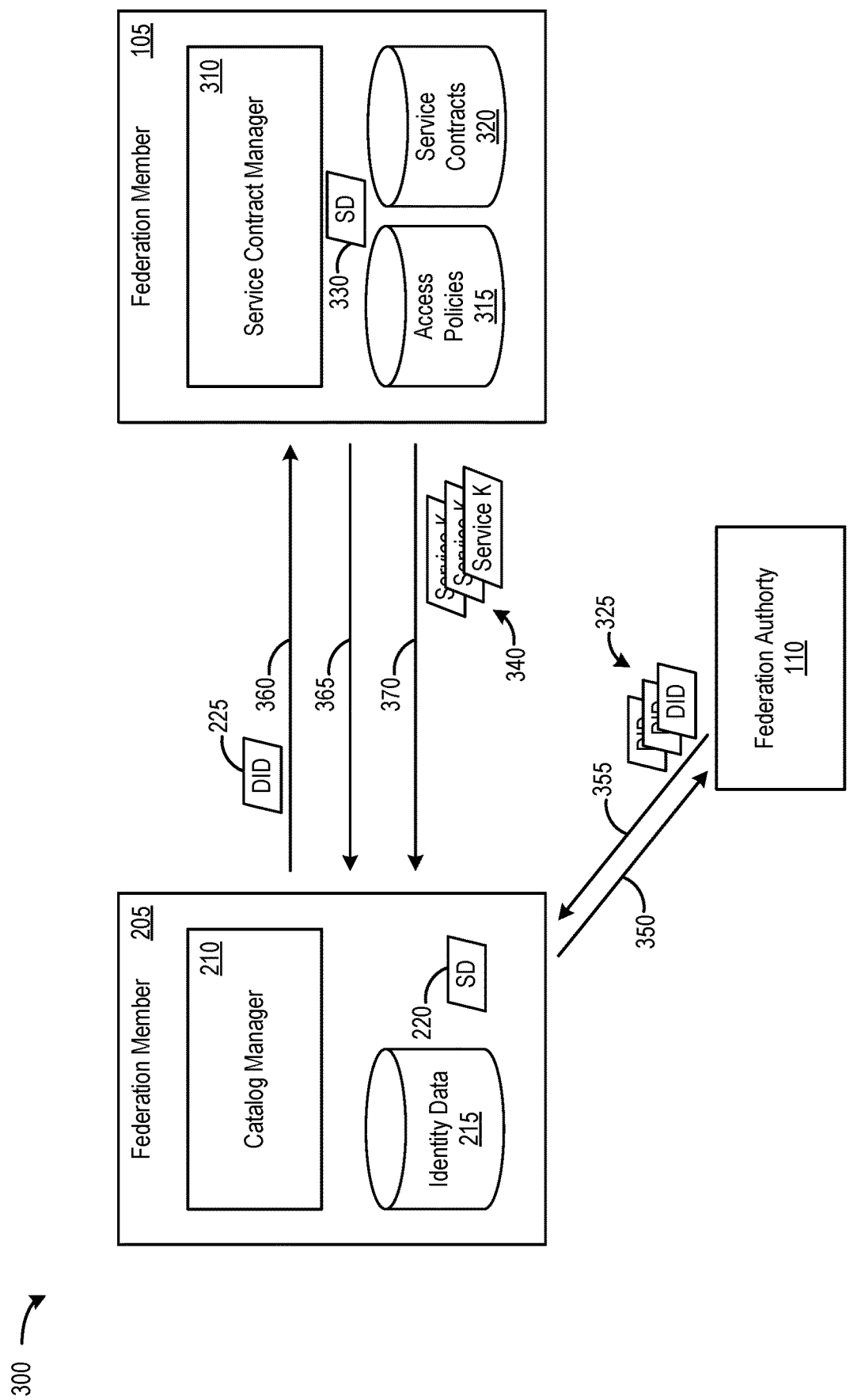
FIG. 3 illustrates an example data flow for controlling data access according to some embodiments.

FIG. 3 illustrates an example data flow 300 for controlling data access according to some embodiments. This example continues from the example above where applicant 205 has joined federation 100. Applicant 205 is now referred to as federation member 205. Data flow 300 may represent the flow of data that occurs between federation member 205 and each of the federation members 105a-n when federation member 205 is discovering service contracts offered by federation members in federation 100. As shown, federation member 105 includes service contracts manager 310, access policies storage 315, and service contracts storage 320. Access policies storage 315 is configured to store policies for determining what data and/or services can be accessed based on a given set of verified credentials and/or claims. Service contracts storage 320 stores service contracts define services provided by federation member 105 and/or data available for access. Different service contracts may define different services, the same service(s) but access to different subsets of data, different access rights to data, etc. Service contracts manager 310 is responsible for managing service contracts. For instance, service contracts manager 310 determines which service contracts stored in service contracts storage 320 are available to a given federation member with a given set of verified credentials and/or claims based on the access policies stored in access policies storage 315.

Data flow 300 starts by federation member 205 sending, at 350, federation authority 110, a request for a list of members in federation 100. In response to the request, federation authority 110 sends, at 355, a set of DIDs 325 for identifying federation members in federation 100 (e.g., DIDs identifying federation members 105a-n). Next, federation member 205 looks up the DID identifying federation member 105. Here, the DID identifying federation member 105 includes a reference to self-description 330, which includes information on how to communicate with federation member 105. Federation member 205 uses this information to send, at 360, federation member 105 a request for a list of available service contracts offered by federation member 105. In addition, federation member 205 sends federation member 105 DID 225 for identifying federation member 205. In this example, self-description 220 also includes an endpoint to identity data storage 215.

Federation member 105 uses the reference in DID 225 to access, at 365, self-description 220 of federation member 205. Then, federation member 105 uses the endpoint to identity data storage 215 to access identity information associated with the federation member 205. For this example, federation member 105 verifies verifiable credentials and verifiable claims stored in identity data storage 215. Based on the verified credentials and/or claims associated with federation member 205, service contract manager 310 determines a set of service contracts 340 stored in service contracts storage 320 to offer federation member 205. At 370, federation member 105 sends the set of service contracts 340 to federation member 205. Once federation member 205 receives the set of service contracts 340, catalog manager 210 stores them in a catalog of available service contracts. Users of federation member 205 may now discover available service contracts offered by federation members 105 and access such services.

Figure 4:
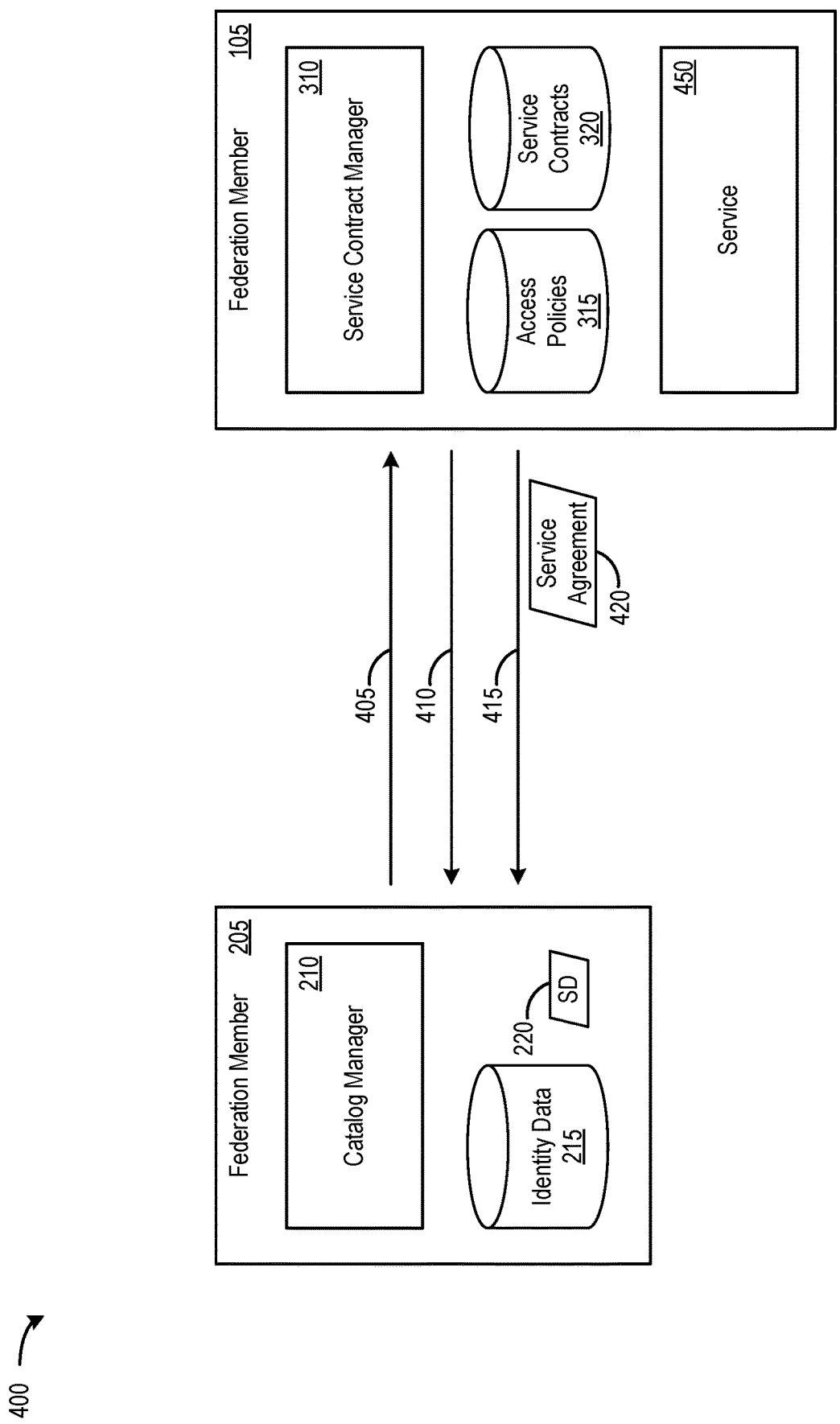
FIG. 4 illustrates an example data flow for negotiating a service contract according to some embodiments.

FIG. 4 illustrates an example data flow 400 for negotiating a service contract according to some embodiments. This example continues from the example above where federation member 105 provided certain service contracts to federation member 205 based on the verified credentials and/or claims associated with federation member 205. Data flow 400 may represent the flow of data that occurs between federation member 205 and each of the federation members 105a-n when federation member 205 is negotiating a service contract with the federation member 105. In this example, a user of federation member 205 has selected an available service contract from the catalog of available service contracts managed by catalog manager 210.

Data flow 400 begins by federation member 205 sending, at 405, federation member 105 a request to negotiate the selected service contract. Once federation member 105 receives the request, federation member re-checks self-description 220 of federation member 205 as well as the verifiable credentials and/or claims of federation member 205 that are stored in identity data storage 215. If the re-check is successful, federation member 105 generates service agreement 420 that allows federation member 205 to access the service and/or data defined in the selected service contract. Also, federation member 105 logs the generation of service agreement 420. At 415, federation member 105 sends service agreement 420 to federation member 205 and any data needed to consume the service (e.g., additional verifiable credentials, access tokens, etc.). Upon receiving service agreement 420, federation member 205 is able to consume service 450, which is the service specified in service agreement 420, provided by federation member 105.

Figure 5:
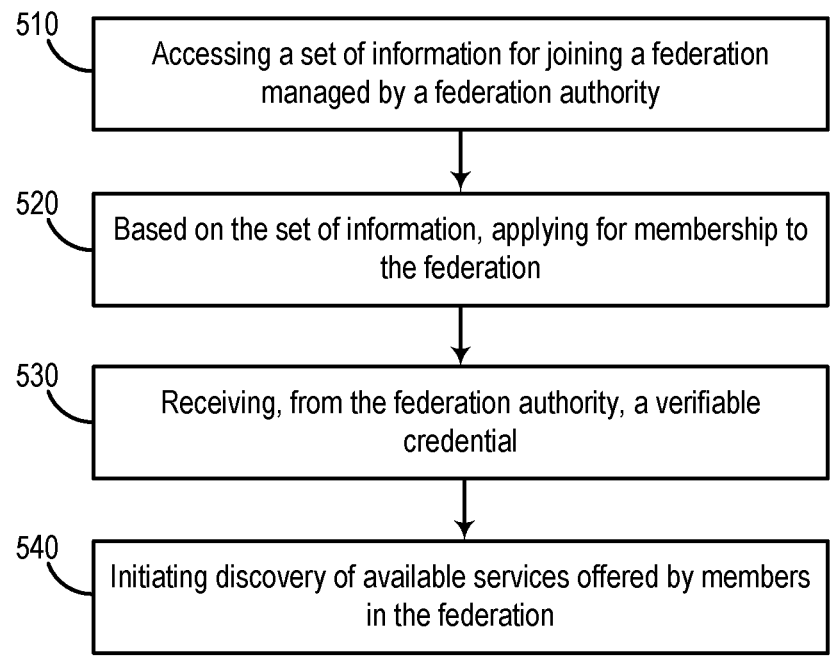
FIG. 5 illustrates a process for joining a federation according to some embodiments.

FIG. 5 illustrates a process 500 for joining a federation according to some embodiments. In some embodiments, a potential federation member (e.g., applicant 205) performs process 500. Process 500 starts by accessing, at 510, a set of information for joining a federation managed by a federation authority. Referring to FIG. 2 as an example, applicant 205 may access the set of information in self-description 225.

Next, based on the set of information, process 500 applies, at 520, for membership to the federation. Referring to FIG. 2 as an example, applicant 205 can apply to federation 100 based on the set of information. In some embodiments, applicant applies for membership to the federation by sending federation authority 110 a request to join federation 100 and DID 255 for identifying applicant 205.

Process 500 then receives, at 530, from the federation authority, a verifiable credential indicating that the potential federation member is a member of the federation. Referring to FIG. 2 as an example, applicant 205 may receive a verifiable credential indicating that applicant 205 is a member of federation 100 if federation authority 110 determines that applicant 205 is allowed to join based on claims in self-description 220 and the policies, rules, and mandatory claims stored in policies and rules storage 120. Finally, process 500 initiates, at 540, discovery of available services offered by members in the federation.

Figure 6:
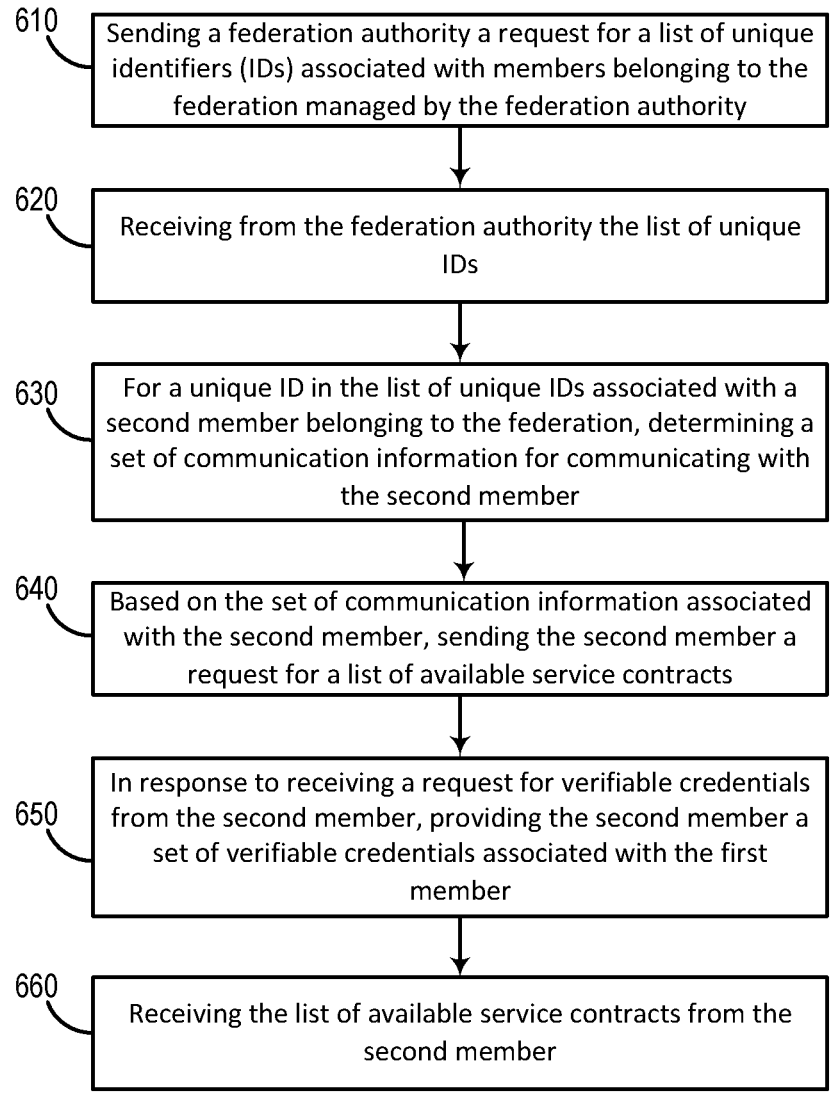
FIG. 6 illustrates a process for controlling access to data according to some embodiments.

FIG. 6 illustrates a process 600 for controlling access to data according to some embodiments. In some embodiments, a federation member (e.g., federation member 205) performs process 600. Process 600 begins by sending, at 610, a federation authority a request for a list of unique identifiers (IDs) associated with members belonging to the federation managed by the federation authority. Referring to FIG. 3 as an example, federation member 205 may send federation authority 110 a request for the list of unique IDs associated with members in federation 100.

Next, process 600 receives, at 620, from the federation authority the list of unique IDs. Referring to FIG. 3 as an example, federation member 205 can receive the list of unique IDs (e.g., set of DIDs 325 for identifying federation members in federation 100) from federation authority 110.

For a unique ID in the list of unique IDs associated with a second member belonging to the federation, process 600 determines, at 630, a set of communication information for communicating with the second member. Referring to FIG. 3 as an example, federation member 205 may determine the set of communication information for communicating with federation member 105 by using the reference to self-description 330 to access the set of communication information included in self-description 330.

Based on the set of communication information associated with the second member, process 600 sends, at 640, the second member a request for a list of available service contracts. Referring to FIG. 3 as an example, federation member 205 sends, based on the set of communication information, federation member 105 a request for a list of available service contracts offered by federation member 105. Federation member 205 can also send federation member 105 DID 225 for identifying federation member 205.

In response to receiving a request for verifiable credentials from the second member, process 600 provides, at 650, the second member a set of verifiable credentials associated with the first member. The second member determines the list of available service contracts based on the set of verifiable credentials and a set of policies and rules. Referring to FIG. 3 as an example, federation member 205 provides federation member 105 access to a set of verifiable credentials stored in identity data storage 215. Based on the set of verified credentials associated with federation member 205, service contract manager 310 determines a set of service contracts 340 stored in service contracts storage 320 to offer federation member 205. Finally, process 600 receives, at 660, the list of available service contracts from the second member. Referring to FIG. 3 as an example, federation member 205 receives the set of service contracts 340 from federation member 105.

Figure 7:
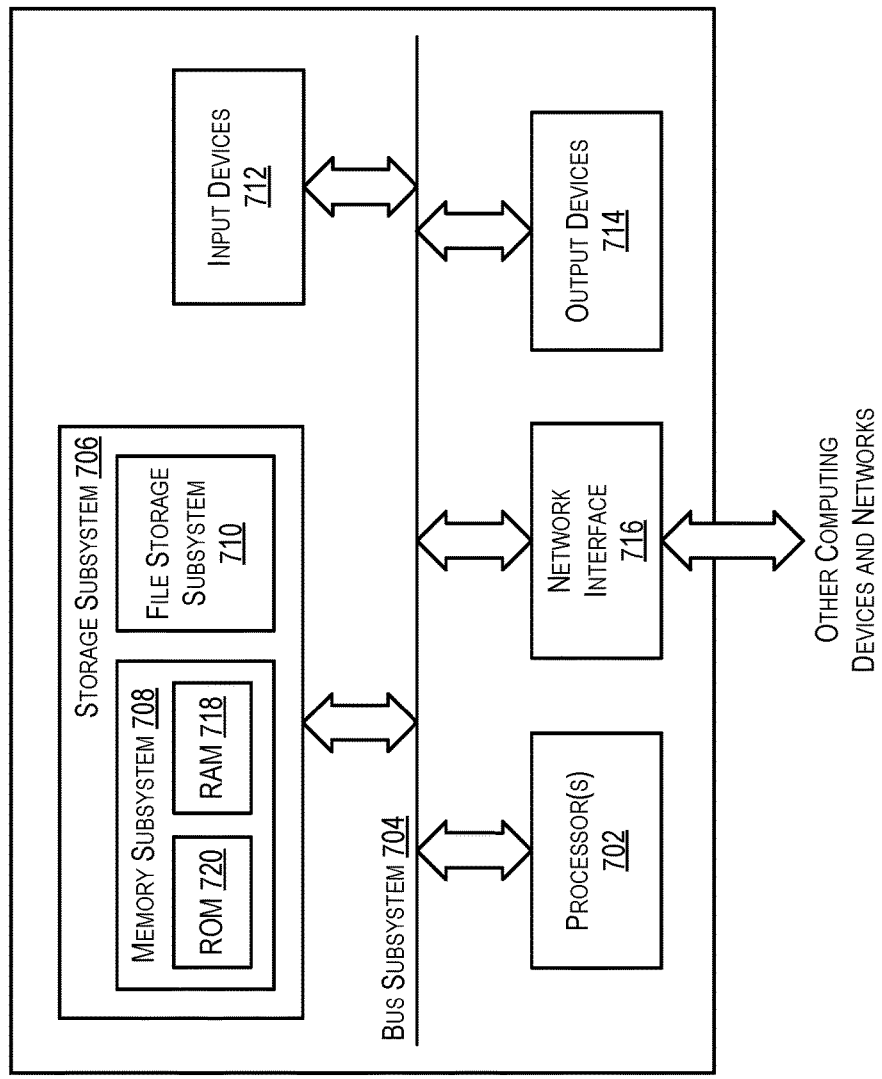
FIG. 7 depicts a simplified block diagram of an example computer system according to some embodiments.

The techniques describe above may be implemented in a wide range of computer systems. FIG. 7 depicts a simplified block diagram of an example computer system 700, which can be used to implement the techniques described in the foregoing disclosure. For instance, computer system 700 may be used to implement federation members 105a-n, federation authority 110, applicant 205, and federation member 305. As shown in FIG. 7, computer system 700 includes one or more processors 702 that communicate with a number of peripheral devices via a bus subsystem 704. These peripheral devices may include a storage subsystem 706 (e.g., comprising a memory subsystem 708 and a file storage subsystem 710) and a network interface subsystem 716. Some computer systems may further include user interface input devices 712 and/or user interface output devices 714.

Bus subsystem 704 can provide a mechanism for letting the various components and subsystems of computer system 700 communicate with each other as intended. Although bus subsystem 704 is shown schematically as a single bus, alternative embodiments of the bus subsystem can utilize multiple busses.

Network interface subsystem 716 can serve as an interface for communicating data between computer system 700 and other computer systems or networks. Embodiments of network interface subsystem 716 can include, e.g., Ethernet, a Wi-Fi and/or cellular adapter, a modem (telephone, satellite, cable, ISDN, etc.), digital subscriber line (DSL) units, and/or the like.

Storage subsystem 706 includes a memory subsystem 708 and a file/disk storage subsystem 710. Subsystems 708 and 710 as well as other memories described herein are examples of non-transitory computer-readable storage media that can store executable program code and/or data that provide the functionality of embodiments of the present disclosure.

Memory subsystem 708 includes a number of memories including a main random access memory (RAM) 718 for storage of instructions and data during program execution and a read-only memory (ROM) 720 in which fixed instructions are stored. File storage subsystem 710 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 700 is illustrative and many other configurations having more or fewer components than system 700 are possible.

FURTHER EXAMPLE EMBODIMENTS

In various embodiments, the present disclosure includes systems, methods, and apparatuses for providing a decentralized federation for attribute-based access control. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a non-transitory machine-readable medium storing a program executable by at least one processing unit of a device associated with a first member in a federation, the program comprising sets of instructions for sending a federation authority a request for a list of unique identifiers (IDs) associated with members belonging to the federation managed by the federation authority; receiving from the federation authority the list of unique IDs; for a unique ID in the list of unique IDs associated with a second member belonging to the federation, determining a set of communication information for communicating with the second member; based on the set of communication information associated with the second member, sending the second member a request for a list of available service contracts; in response to receiving a request for verifiable credentials from the second member, providing the second member a set of verifiable credentials associated with the first member, wherein the second member determines the list of available service contracts based on the set of verifiable credentials and a set of policies and rules; and receiving the list of available service contracts from the second member.

In one embodiment, the present disclosure further sends the second member a particular unique ID for identifying the first member, wherein the second member uses the particular unique ID to retrieve the set of verifiable credentials associated with the first member.

In one embodiment, the present disclosure further stores the list of available service contracts in a catalog of available service contracts provided by members in the federation.

In one embodiment, the present disclosure further receives a selection of an available service contract provided by a member of the federation; sends the member a request for a service contract negotiation; and receives from the member a service contract agreement and a set of data for accessing and consuming a service specified in the service contract agreement.

In one embodiment, the present disclosure further sends the member the set of data and a request to consumer the service.

In one embodiment, the list of unique IDs comprises a set of decentralized identifiers (DIDs) associated with members belonging to the federation.

In one embodiment, each member in the federation belong to a separate cloud computing system.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A non-transitory machine-readable medium storing a program executable by at least one processing unit of a device associated with a first member in a federation, the program causing the at least one processing unit to:
send a federation authority a request for a list of unique identifiers (IDs) associated with members belonging to the federation managed by the federation authority;
receive from the federation authority the list of unique IDs;
for a unique ID in the list of unique IDs associated with a second member belonging to the federation, determine a set of communication information for communicating with the second member;
based on the set of communication information associated with the second member, send the second member a request for a list of available services;
in response to receiving a request for verifiable credentials from the second member, provide the second member a set of verifiable credentials associated with the first member, wherein the second member determines the list of available services based on the set of verifiable credentials and a set of policies and rules; and
receive the list of available services from the second member.

2. The non-transitory machine-readable medium of claim 1, wherein the program further causes the at least one processing unit to send the second member a particular unique ID for identifying the first member, wherein the second member uses the particular unique ID to retrieve the set of verifiable credentials associated with the first member.

3. The non-transitory machine-readable medium of claim 1, wherein the program further causes the at least one processing unit to store the list of available services in a catalog of available services provided by members in the federation.

4. The non-transitory machine-readable medium of claim 1, wherein the program further causes the at least one processing unit to:
receive a selection of an available service provided by a member of the federation;
send the member a request for a service negotiation; and
receive from the member a service agreement and a set of data for accessing and consuming a service specified in the service agreement.

5. The non-transitory machine-readable medium of claim 4, wherein the program further causes the at least one processing unit to send the member the set of data and a request to consume the service.

6. The non-transitory machine-readable medium of claim 1, wherein the list of unique IDs comprises a set of decentralized identifiers (DIDs) associated with members belonging to the federation.

7. The non-transitory machine-readable medium of claim 1, wherein each member in the federation belongs to a separate cloud computing system.

8. A method executable by a first member of a federation, the method comprising:
sending a federation authority a request for a list of unique identifiers (IDs) associated with members belonging to the federation managed by the federation authority;
receiving from the federation authority the list of unique IDs;
for a unique ID in the list of unique IDs associated with a second member belonging to the federation, determining a set of communication information for communicating with the second member;
based on the set of communication information associated with the second member, sending the second member a request for a list of available services;
in response to receiving a request for verifiable credentials from the second member, providing the second member a set of verifiable credentials associated with the first member, wherein the second member determines the list of available services based on the set of verifiable credentials and a set of policies and rules; and
receiving the list of available services from the second member.

9. The method of claim 8, further comprising sending the second member a particular unique ID for identifying the first member, wherein the second member uses the particular unique ID to retrieve the set of verifiable credentials associated with the first member.

10. The method of claim 8 further comprising storing the list of available services in a catalog of available services provided by members in the federation.

11. The method of claim 8 further comprising:
receiving a selection of an available service provided by a member of the federation;
sending the member a request for a service negotiation; and
receiving from the member a service agreement and a set of data for accessing and consuming a service specified in the service agreement.

12. The method of claim 11 further comprising sending the member the set of data and a request to consume the service.

13. The method of claim 8, wherein the list of unique IDs comprises a set of decentralized identifiers (DIDs) associated with members belonging to the federation.

14. The method of claim 8, wherein each member in the federation belongs to a separate cloud computing system.

15. A system associated with a first member in a federation comprising:
a set of processing units; and
a non-transitory machine-readable medium storing instructions that when executed by at least one processing unit in the set of processing units cause the at least one processing unit to:
send a federation authority a request for a list of unique identifiers (IDs) associated with members belonging to the federation managed by the federation authority;
receive from the federation authority the list of unique IDs;
for a unique ID in the list of unique IDs associated with a second member belonging to the federation, determine a set of communication information for communicating with the second member;
based on the set of communication information associated with the second member, send the second member a request for a list of available services;
in response to receiving a request for verifiable credentials from the second member, provide the second member a set of verifiable credentials associated with the first member, wherein the second member determines the list of available services based on the set of verifiable credentials and a set of policies and rules; and
receive the list of available services from the second member.

16. The system of claim 15, wherein the instructions further cause the at least one processing unit to send the second member a particular unique ID for identifying the first member, wherein the second member uses the particular unique ID to retrieve the set of verifiable credentials associated with the first member.

17. The system of claim 15, wherein the instructions further cause the at least one processing unit to store the list of available services in a catalog of available services provided by members in the federation.

18. The system of claim 15, wherein the instructions further cause the at least one processing unit to:
receive a selection of an available service provided by a member of the federation;
send the member a request for a service negotiation; and
receive from the member a service agreement and a set of data for accessing and consuming a service specified in the service agreement.

19. The system of claim 15, wherein the instructions further cause the at least one processing unit to send the member the set of data and a request to consume the service.

20. The system of claim 15, wherein the list of unique IDs comprises a set of decentralized identifiers (DIDs) associated with members belonging to the federation.

* * * * *